N. A. WEBSTER.
CHICKEN COOP.
APPLICATION FILED AUG. 31, 1921.
1,426,933.
Patented Aug. 22, 1922.
2 SHEETS—SHEET 1.
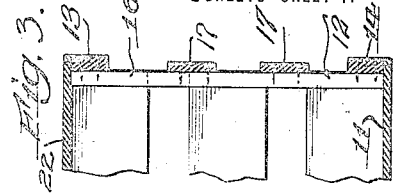
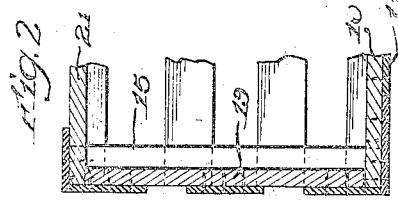
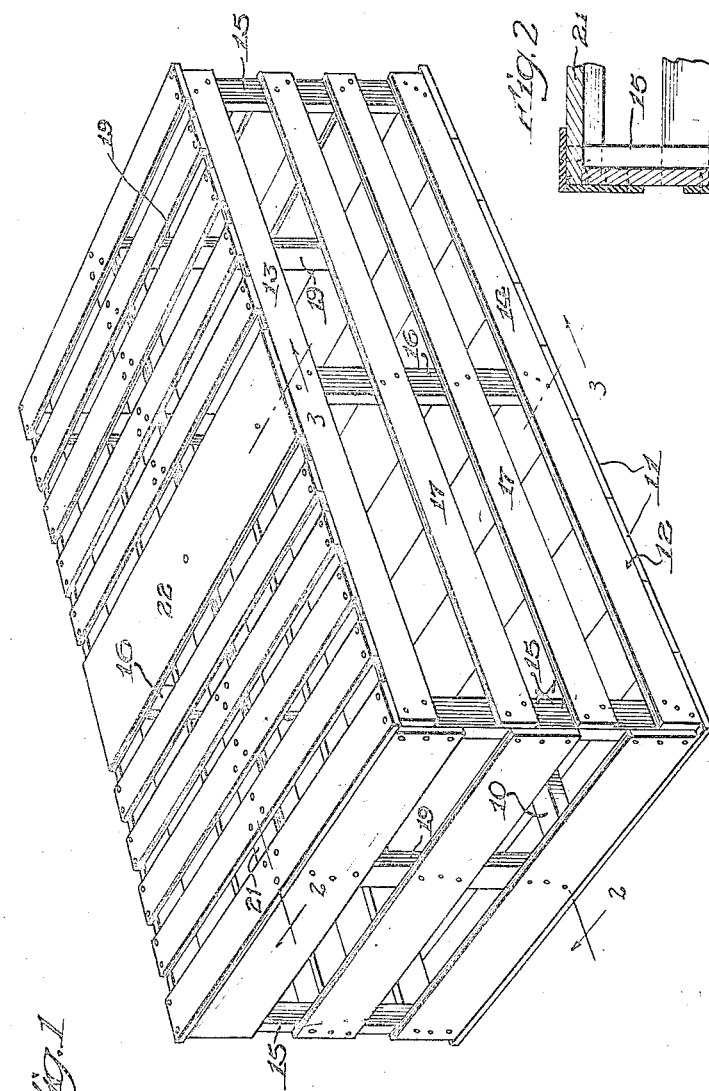
Inventor
Neil Ace Webster
By Clarence J. Lofted Atty

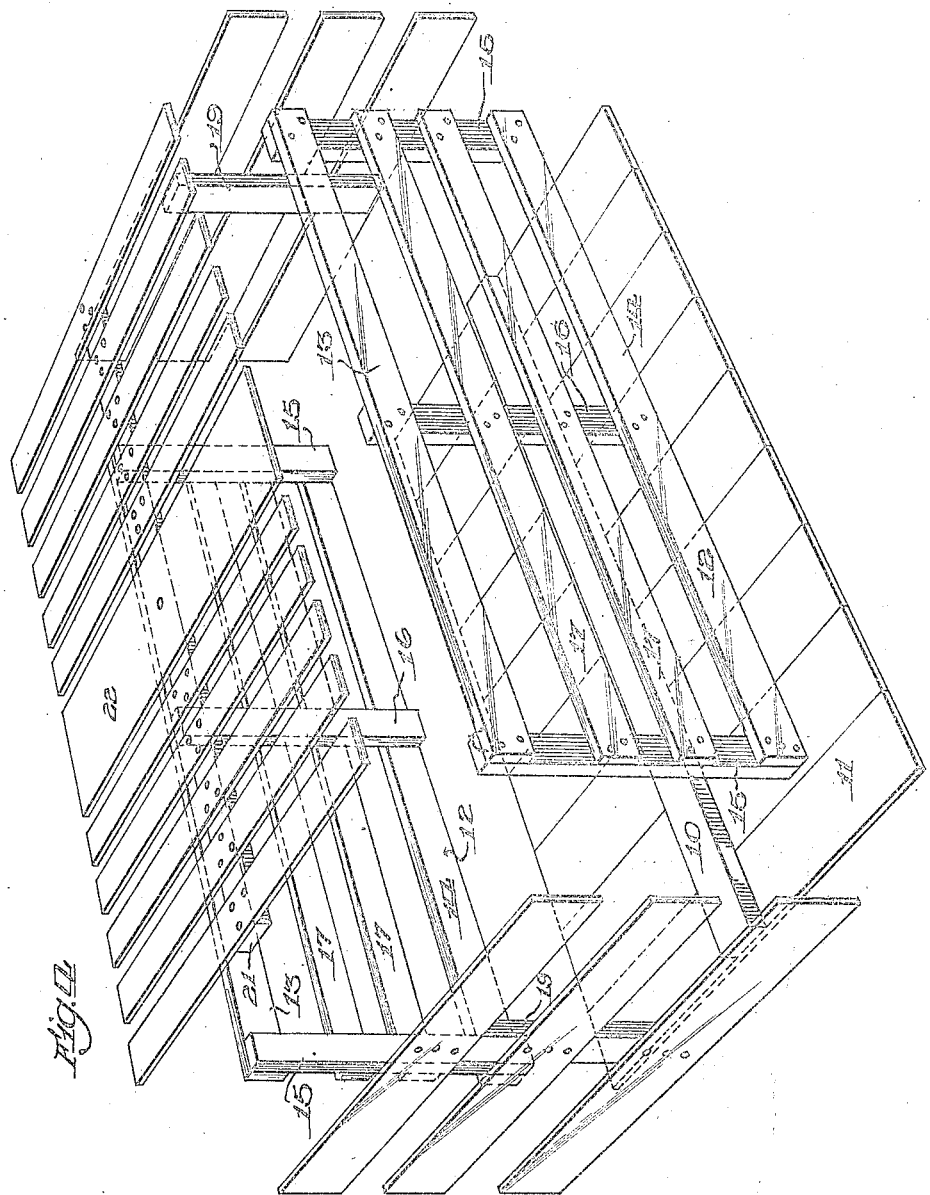

UNITED STATES PATENT OFFICE.

NEIL ACE WEBSTER, OF WAUCOMA, IOWA.

CHICKEN COOP.

1,426,933. Specification of Letters Patent. Patented Aug. 22, 1922.

Application filed August 31, 1921. Serial No. 497,117.

*To all whom it may concern:*

Be it known that I, NEIL ACE WEBSTER, a citizen of the United States, residing at Waucoma, in the county of Fayette and State of Iowa, have invented a certain new and useful Improvement in Chicken Coops, of which the following is a specification.

My invention pertains to coops for efficiently and safely transporting by express, freight or otherwise, live poultry such as chickens. Prior to my invention the coops used for this purpose were very undesirable and expensive as usually they are only good for one trip of any distance; they were bulky, heavy and expensive to make, being bound and fastened together with wire, hoops, and the like. All of these disadvantages and objections are overcome with coops embodying my invention, which have gone into extensive use since their adoption and are giving entire satisfaction, for I have provided a coop made up of units which can be shipped in knock-down form and readily secured together at the place where used in a rigid and substantial manner and when so secured, is good for many trips, either when loaded with poultry or being returned empty, and at the same time is comparatively light in weight, thus reducing the transportion rates.

It is a further object of my invention to provide a coop of this class, which, while light in weight, is durable and inexpensive.

It is a further object of my invention to provide a coop made up of units in such a manner so that the separate units can be readily and quickly secured together in a rigid and substantial form.

It is a further object to provide a coop so designed as to permit of fast handling of the chickens into or out of the coop.

It is the further object to provide a coop of this type which as a whole can be readily moved, slid or handled when loaded or empty.

It is a further object to provide a chicken coop so designed as to eliminate the loss of heads of the chickens in shipping.

The above and other features of novelty, advantages and capabilities will become apparent from a detailed description of the accompanying drawings in which I have illustrated a chicken coop adapted for transporting live chickens, embodying one form of my invention, but the construction there shown is to be understood as illustrative only and not as defining the limits of my invention.

Figure 1 is a perspective view illustrating a chicken coop, embodying one form of my invention.

Figure 2 is a sectional view, taken on the line 2—2 Figure 1.

Figure 3 is a sectional view taken on the line 3—3 of Figure 1 and

Figure 4 is a diagrammatic view showing the different units after having been separately constructed and preparatory to being united or secured, one to another.

Prior to my invention the most satisfactory coop utilized for transporting live chickens and the like, and the only one used to any extent at all, was a wired bound coop generally designated in the trade as a "one trip coop." It was so designated by virtue of the fact that it was not returnable by the express companies and because of this the transporting of chickens by express, as they usually are, was very expensive, as it was only good for one trip and necessarily the expense of such coop would have to be absorbed in the one shipment. However, the coops embodying my invention are returnable by the express companies due to the fact that they will stand several trips and are generally indicated in the trade as the "coop of several trips."

Referring to the accompanying drawings in detail, the coop illustrated is constructed of six separate units, which, when secured together comprise the top, bottom, sides and ends. In practice the outside dimensions of the standard size completed coop is 36x24x12 inches, weighs about fifteen pounds, its capacity being from 75 to 85 pounds, and on test has supported 4300 pounds without injury. In constructing the different units for the coop at the factory in knockdown form, we will, for the purpose of illustration say that we start first with the bottom unit, although it is perfectly obvious that any unit may be constructed first or all at the same time by different men. In constructing the bottom unit comparatively thin boards of the desired length usually 24 inches, are nailed intermediate their ends to a substantial rib 10 which rib terminates at either end short of the extreme outer edges of the bottom 11. The sides 12 are in practice constructed by securing or nailing a top and bottom rail 13 and 14 of substantial cross sections to corner posts 15 and a center post 16. Between the top and bottom rail and parallel therewith is secured to the corner and center posts two comparatively thin slats 17. The end units are constructed by nailing or otherwise securing three comparatively thin slats intermediate their ends to a substantial rib 19 which rib is of a length shorter than the heights of the finished coop, for a purpose presently to be described. Likewise the end slats are of the length shorter than the width of the bottom of the finished coop. The top is constructed of a plurality of comparatively thin slats of the same length as the boards forming the bottom, which slats are rigidly secured intermediate their ends to a substantial rib 21 from end to end, save for a central space or opening of about eight inches. These slats are closely spaced for reasons hereafter referred to. Within the opening in the top unit between the closely spaced slats just referred to is detachably secured to the rib a closure 22 of substantial thickness, so that it can be readily removed or rotated, so as to permit ready movement of the chickens into or out of the coop.

The parts thus far described as before stated, are constructed at the factory and if desired can be shipped in knock-down form in a comparatively small flat package.

Before the different units are assembled, they would appear as in Figure 4. The first step in assembling usually is to nail the bottom unit to the side units, the bottom being nailed to the comparatively heavy lower side rails 14. These side rails are of such a design as to afford sufficient nailing surface to effect a substantial union or connection between the bottom and sides. After the bottom and sides have been secured together such parts are placed in an upright position and the end units are then nailed to the corner posts 15 on the side pieces. The last and final step is to secure the top in place by nailing the slats of the top unit to the upper side rails 13 and the center rib 21 of the top unit to the center ribs 19 of the end units on which the rib 21 of the top unit rests. This completes the coop save for the closure 22 which in practice and as illustrated in accompanying drawing, consists of a solid board having a greater thickness than the slats going to make up the top, so that its upper surface extends slightly above the upper plane of the slats. This closure 22 in practice is about six inches wide and is detachably secured to the center rib 21 and the two side posts 16, that is supported by these members. With this form of closure it permits the fast handling of the poultry into and out of the coop and further by utilizing the substantial closure of this kind supported as it is, it permits of the ready handling of coops when placed on top of one another, as it serves in a way as a turn table in sliding and turning the coops and further reduces the friction of the superimposed coops and takes up the load to relieve the comparatively thin slats.

From the method and manner of assembling above described, it will be seen that when the coop is completed that I have provided, without sacrificing the unit or knock-down idea, a light but rigid coop, having in reality three separate substantial frame members for reinforcing the coop and supporting the tremendous superimposed load to which these coops are subjected in the ordinary use, to which frame members the bottom, sides, tops and ends are securely fastened. The side frame members comprise the substantial top and bottom rails 13 and 14, the corner posts 15 and the center posts 16, and the center frame member comprises a bottom rib 10, top rib 21 and end ribs 19, all arranged and brought together in such a manner as not to disturb in any manner the continuity of the parts throughout. The end ribs 19 are in direct contact with and supported on the bottom rib 10 as best shown in Figure 2, and the top rib 21 is in contact with and supported on the end ribs 19 as best shown in the same figure. The upper and lower side rails 13 and 14 are of substantially greater cross sections than the side slats 17 as best shown in Figure 3. The closure for the opening in the top heretofore referred to is supported near its ends on the center post of the side units 16 likewise shown in the same figure. It will be noted that the ends and corners of all the ribs and posts are within the coop and protected by the slats forming the bottom, sides, top and ends thereof. By having the slats in the top unit closely spaced the "loss of heads in shipping" is eliminated.

I claim:

1. A light, rigid, return coop comprising a plurality of pre-constructed sections adapted to be initially shipped in knock-down form and readily assembled into a completed permanent light rigid structure, said sections including a bottom section provided with a central rib, side sections provided with top and bottom supporting rails, end and central posts secured to said rails, and comparatively thin slats secured to said posts end sections consisting of end posts and thin slats rigidly secured thereto and a top section of comparatively thin slats provided with a central rib to which the slats are rigidly secured, and when assembled said end and top sections being secured respectively to said side posts and top rails and a readily removable closure in the top section substantially as and for the purpose set forth.

2. A light, rigid return coop comprising a plurality of pre-constructed sections adapted to be initially shipped in knocked down form and readily assembled into a complete permanent light, rigid, structure, said sections including a bottom section provided with a central rib, side sections provided with end and central posts, and top and bottom rails rigidly secured to the end and central posts and comparatively thin slats secured to said posts, end sections, consisting of central posts and comparatively thin slats rigidly secured to the central posts, said central posts adapted to rest on the rib of the bottom section when the sections are assembled, a top section provided with a central rib adapted when the sections are assembled to rest on the central posts of the end sections, and means for rigidly and permanently securing the parts together, substantially as and for the purpose set forth.

In witness whereof, I hereunto subscribe my name to this specification in the presence of two witnesses.

NEIL ACE WEBSTER.

Witnesses:
M. F. OLAFSON.
G. R. LUCE.